(12) United States Patent
Takagi

(10) Patent No.: US 11,748,047 B2
(45) Date of Patent: Sep. 5, 2023

(54) SYSTEM AND CONTROL METHOD OF SYSTEM

(71) Applicant: CANON KABUSHIKI KAISHA, Tokyo (JP)

(72) Inventor: Noriko Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/705,723

(22) Filed: Mar. 28, 2022

(65) Prior Publication Data

US 2022/0317952 A1    Oct. 6, 2022

(30) Foreign Application Priority Data

Mar. 30, 2021    (JP) ................................. 2021-057435

(51) Int. Cl.
*G06F 3/12*    (2006.01)
(52) U.S. Cl.
CPC .......... *G06F 3/1239* (2013.01); *G06F 3/1222* (2013.01); *G06F 3/1287* (2013.01); *G06F 3/1292* (2013.01)
(58) Field of Classification Search
CPC .... G06F 3/1239; G06F 3/1222; G06F 3/1287; G06F 3/1292
See application file for complete search history.

(56) References Cited

U.S. PATENT DOCUMENTS

| | | | |
|---|---|---|---|
| 9,690,522 B2 * | 6/2017 | Yasukawa | ............. G06F 3/1219 |
| 10,404,889 B2 * | 9/2019 | Miyamoto | ......... H04N 1/00204 |
| 2015/0092233 A1 * | 4/2015 | Park | .................. H04N 1/00244 |
| | | | 358/1.15 |
| 2018/0253268 A1 * | 9/2018 | Tonegawa | ............. G06F 3/1238 |
| 2018/0341759 A1 * | 11/2018 | Sato | ...................... H04L 9/3247 |

FOREIGN PATENT DOCUMENTS

JP    2018206278 A    12/2018

\* cited by examiner

*Primary Examiner* — John R Wallace
(74) *Attorney, Agent, or Firm* — ROSSI, KIMMS & McDOWELL LLP

(57) ABSTRACT

A system includes a first cloud print service and a second cloud print service, the first cloud print service connected with a client terminal via a network and the second cloud print service connected with an image forming apparatus via the network. The first cloud print service stores print job data received from the client terminal in one or more first memories, requires the second cloud print service to issue a job code of the print job data, associates the job code issued by the second cloud print service with the print job data, and transmits the stored print job data to the second cloud print service when receiving information indicating the stored print job data from the second cloud print service. The second cloud print service issues the job code of the print job data when issuance of the job code of the print job data is requested by the first cloud print service, associates the issued job code with information indicating the first cloud print service, and transmits the information indicating the print job data corresponding to the job code to the first cloud print service associated with the received job code when receiving the job code from the image forming apparatus.

5 Claims, 8 Drawing Sheets

FIG. 5A

LOG IN — 500

- USER NAME — 501
- PASSWORD — 502
- OK — 503
- CANCEL — 504

- REGISTER PRINT JOB — 511
- CONFIRM PRINT JOB — 512
- SETTING — 513

FIG. 5C

DESIGNATION OF DOCUMENT — 520

DESIGNATION OF DOCUMENT BY DRAGGING AND DROPPING — 521

☑ PERMIT PRINTING IN PUBLIC SPACE — 522

- OK — 523
- CANCEL — 524

- JOB CODE: 12345
- EXPIRATION DATE: DECEMBER 4, 2020
- FILENAME: SUGGESTIONS_FOR_CUSTOMERS.pptx

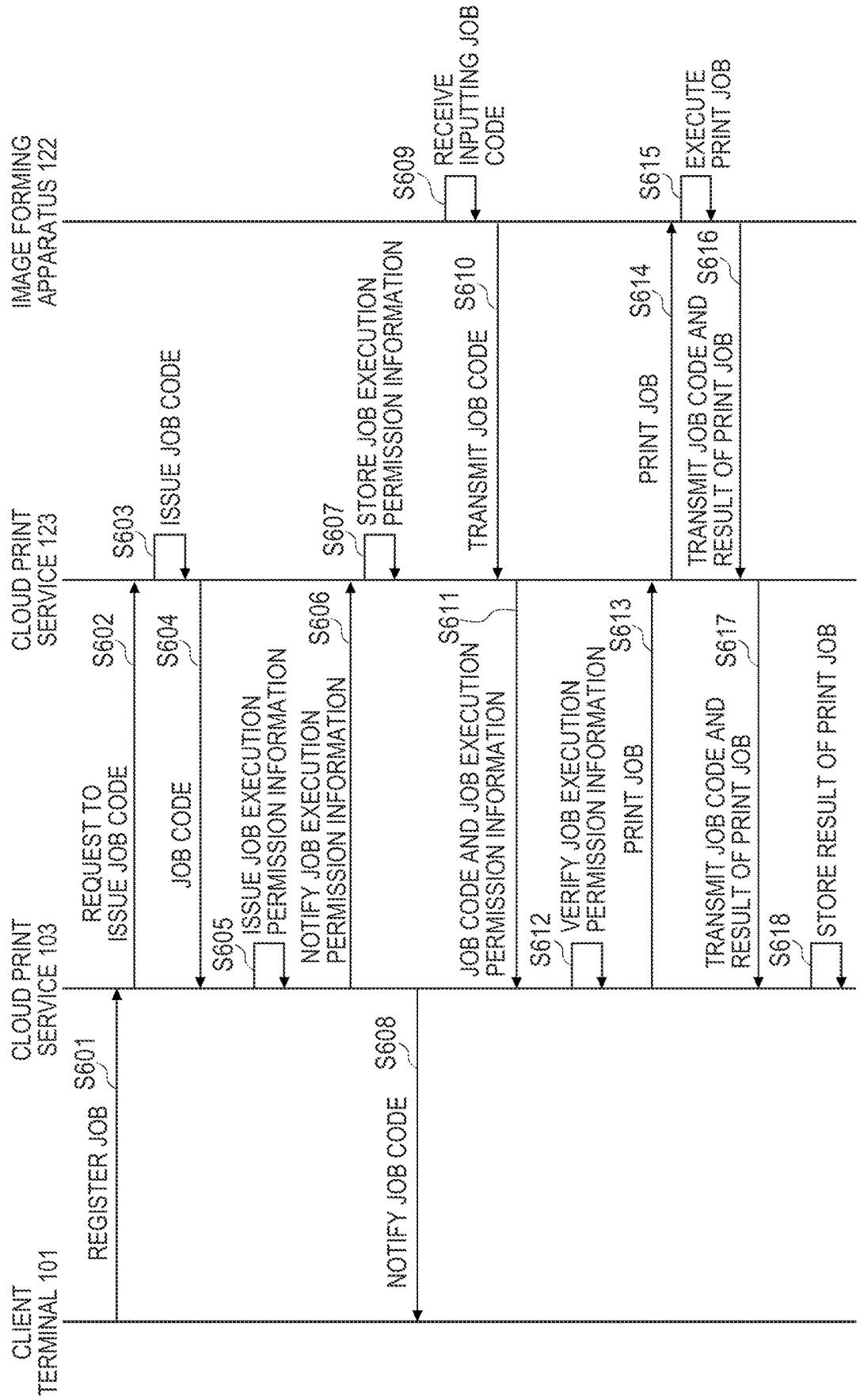

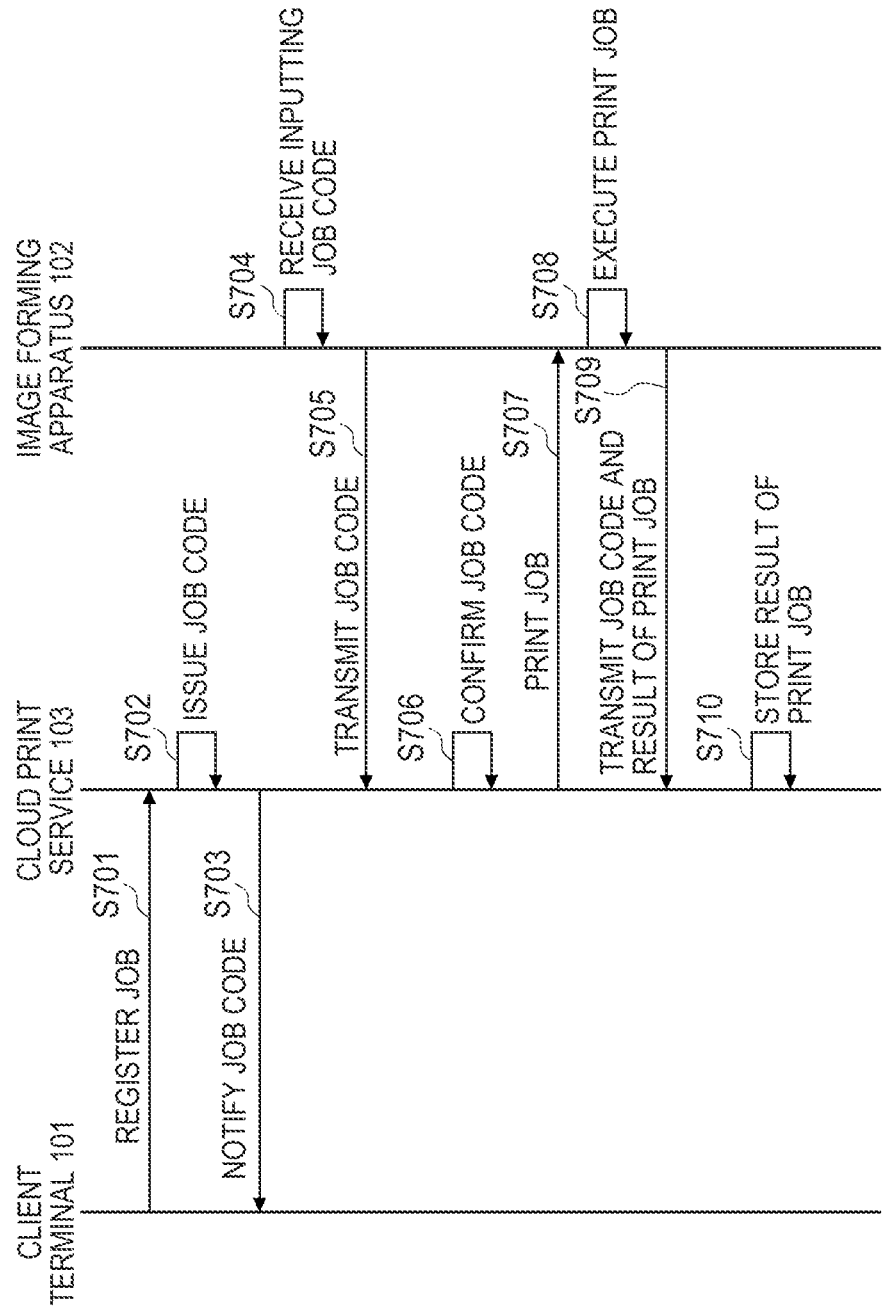

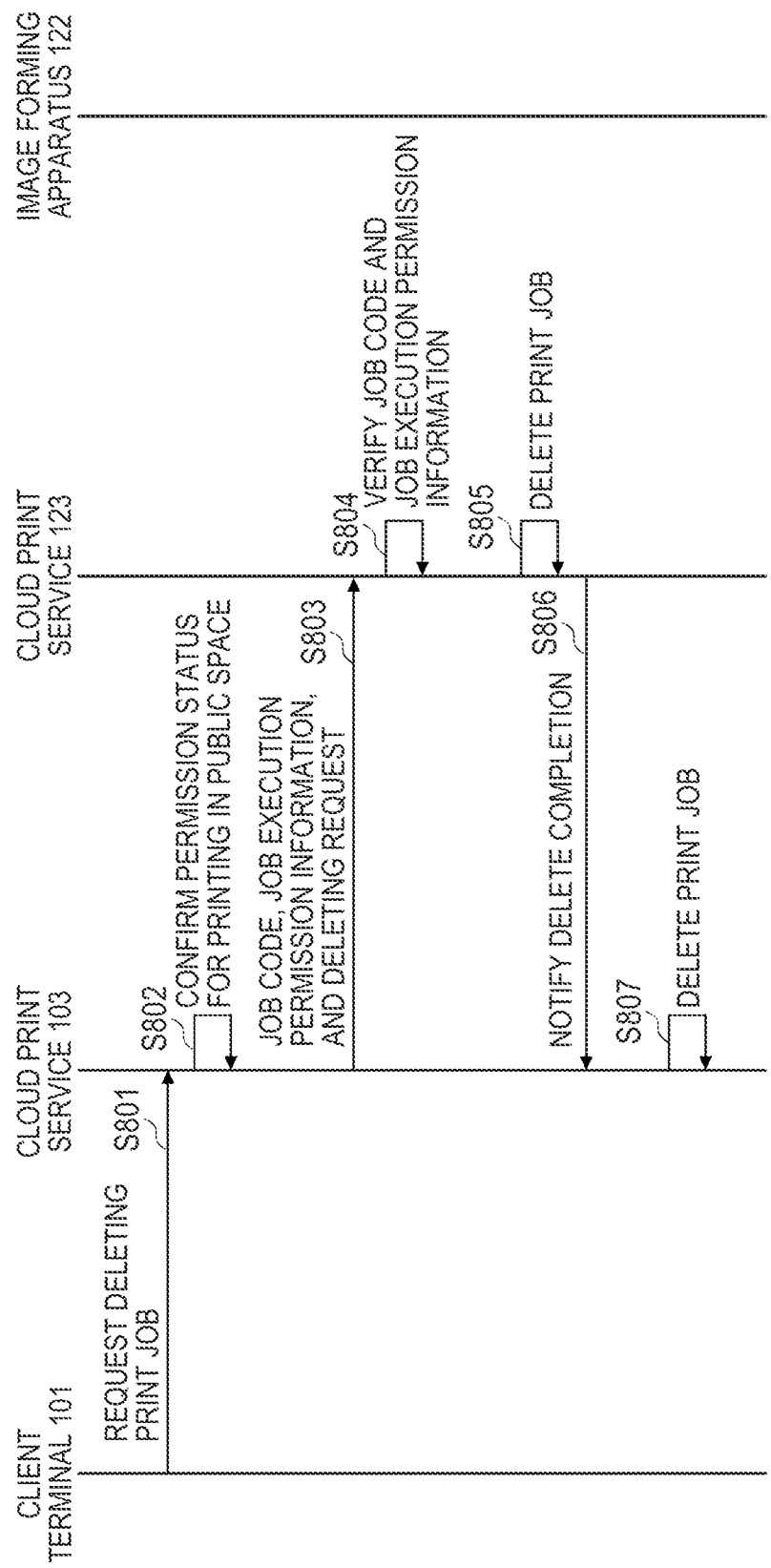

SYSTEM AND CONTROL METHOD OF SYSTEM

BACKGROUND OF THE INVENTION

Field of the Invention

The present invention relates to a system and a control method of the system.

Description of the Related Art

In recent years, a cloud print service that inputs a print job through a network service called a cloud and transmits the print job to an image forming apparatus has begun to spread. In a printing system using such a cloud print service, an image forming apparatus is registered with a tenant corresponding to the cloud print service, and a user belonging to the tenant is set to be permitted to use the image forming apparatus.

In the present disclosure, a tenant corresponds to a service system that a user deploys on the cloud, and has a storage area in which access is restricted to the user. For example, in a company A tenant of a cloud print service used in a company A, an employee working for the company A is registered as a user, and an image forming apparatus under the control of the company A is registered and used. Thus, the user of the company A can transmit the instruction of the printing to the image forming apparatus under the management of the company A to print the document by using the image forming apparatus.

On the other hand, in accordance with the diversification of working styles, there is a demand for the introduction of a mechanism that enables the printing of documents stored in client terminals in the company by using image forming apparatuses installed in so-called public spaces such as convenience stores, libraries, and stations. In response to these requests, a cloud print service that allows printing in public spaces is also available. This service is a cloud print service utilizing a configuration commonly referred to as a public cloud, and is associated with, for example, a public tenant. In the present disclosure, such a print service is also referred to as a "public print service". In some cases, the public print service performs user management based on the public tenant, and in other cases, a function capable of printing as a guest is provided regardless of the presence or absence of user management. The image forming apparatus for printing in a public space may be registered and managed by a public print tenant.

In guest printing in a public print service, when a print job is received from a client terminal such as a PC or a mobile terminal, a job code unique to the print job is issued and the client terminal is notified of the job code. When a user executes printing in a public space, the user inputs the job code to the image forming apparatus, thereby allowing the image forming apparatus to specify a target print job and execute printing. A function for automatically deleting a job whose expiration date has passed is also provided by setting an expiration date for a print job stored in the public print service.

As described above, in the cloud print service, for example, two use cases of "printing using an image forming apparatus installed in a company" and "printing using an image forming apparatus installed in a public space" can be assumed. An example of a specific situation in which these use cases can be applied is a situation in which a document scheduled to be printed in a public space is printed internally in advance to confirm that the printing configuration is satisfactory.

For example, Japanese Patent Application Laid-Open No. 2018-206278 discloses an example of a technology for enabling printing in an external tenant by concealing some information such as user account information and charging information from the external tenant and sharing only necessary information among the tenants.

On the other hand, in general, the public print service stores the print job on the public print service whose server address is published. It may be difficult for the image forming apparatus belonging to the tenant to access the public print service, and as a result, it may be difficult to perform printing using the image forming apparatus.

On the other hand, it is a waste of resources to retain print data redundantly on the cloud print service corresponding to each of the image forming apparatuses in the company and the image forming apparatuses in the public space in order to enable printing.

SUMMARY OF THE INVENTION

According to an aspect of the present invention, a system includes a first cloud print service and a second cloud print service, the first cloud print service connecting with a client terminal via a network and the second cloud print service connecting with an image forming apparatus via the network, the first cloud print service comprising: one or more first memories; and one or more first processors that execute a set of first instructions to: store print job data received from the client terminal in the one or more first memories; require, to the second cloud print service, to issue a job code of the print job data; manage the job code issued by the second cloud print service by associating with the print job data; and transmit the stored print job data to the second cloud print service when receiving information indicating the stored print job data from the second cloud print service, the second cloud print service comprising: one or more second memories; and one or more second processors that execute a set of second instructions to: issue the job code of the print job data when issuance of the job code of the print job data is requested by the first cloud print service; manage the issued job code by associating with information indicating the first cloud print service; and transmit the information indicating the print job data corresponding to the job code to the first cloud print service associated with the received job code when receiving the job code from the image forming apparatus.

Further features of the present invention will become apparent from the following description of exemplary embodiments with reference to the attached drawings.

BRIEF DESCRIPTION OF THE DRAWINGS

FIG. 5A illustrates an example of a top screen of a UI.

FIG. 5B illustrates an example of a menu screen of the UI.

FIG. 5C illustrates an example of a screen for receiving a designation of a document to be printed from a user.

FIG. 5D illustrates an example of a screen for job code notification.

FIG. 6 illustrates an example of a sequence diagram of a processing sequence of a printing system.

FIG. 7 illustrates an example of a sequence diagram of a processing sequence of a printing system.

FIG. 8 illustrates an example of a sequence diagram of a processing sequence of a printing system.

DESCRIPTION OF THE EMBODIMENTS

Figure 1:
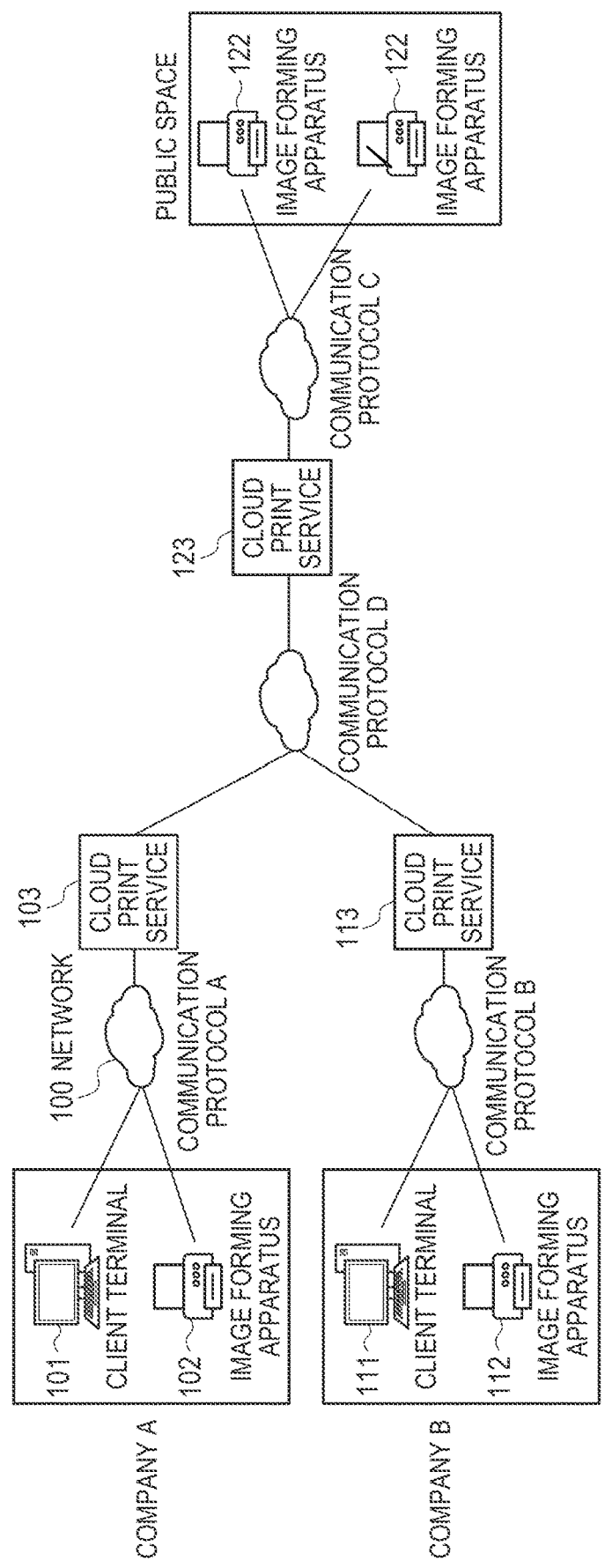
FIG. 1 illustrates an example of the overall configuration of the printing system.

A preferred embodiment of the present disclosure will now be described in detail with reference to the accompanying drawings. In this specification and the drawings, components having substantially the same functional configuration are denoted by the same reference numerals, thereby omitting redundant explanations.

[System Configuration]

An example of a system configuration of a printing system according to the present embodiment will be described with reference to FIG. 1. The system illustrated in FIG. 1 includes Cloud Print Service (CPS) 103, 113, and 123. The CPS 103 schematically shows a cloud print service that can be used by a user (for example, employees, etc.) under the management of company A. A client terminal 101 and an image forming apparatus 102 schematically show a client terminal and an image forming apparatus under the management of the company A. In other words, each of the CPS 103, the client terminal 101, and the image forming apparatus 102 is associated with a tenant of company A. Similarly, each of the CPS 113, a client terminal 111, and an image forming apparatus 112 is associated with a tenant of company B that is different from the tenant of company A. The CPS 123 also schematically illustrates a cloud printing service using the public cloud. An image forming apparatus 122 schematically shows an image forming apparatus usable in a public space. In other words, each of the CPS 123 and the image forming apparatus 122 is associated with a public tenant. Each of the CPS 103 and the CPS 113 corresponds to an example of "a first cloud print service". The CPS 123 corresponds to an example of "a second cloud print service".

With such a configuration, for example, when the CPS 103 receives a request for print job data (hereinafter referred to simply as "print job") from the client terminal 101, the CPS 103 transmits the print job to the image forming apparatus 102. When receiving a print job from the CPS 103, the image forming apparatus 102 executes printing based on the print job. The same processing can be applied between the client terminal 111, the CPS 113, and the image forming apparatus 112. In the following description, the tenants of company A and the tenants of company B are collectively referred to as "internal tenants" for convenience. Each of the client terminal 101, the client terminal 111, the image forming apparatus 102, and the image forming apparatus 112 may be plural.

When instructed by the client terminal 101 to permit "printing in the public space", the CPS 103 transmits job information and tenant information to the CPS 123 and requests the issuance of a job code as a unique identification formula for the print job. The job information is information related to a job (for example, a print job or the like). The tenant information is information about the tenant associated with the CPS 103 (in this case, information about company A). The same processing can also be applied between the client terminal 111, the CPS 113, and the CPS 123.

The CPS 123 receives information related to the print job from the CPS 103 or the CPS 113 and issues a job code. The information related to the print job may include, for example, tenant information related to a tenant associated with the CPS 103 or the CPS 113 as a transmission source of the print job, and job information related to the print job (for example, the expiration date of a print job, etc.). Thereafter, when receiving a request for a print job and a job code from the image forming apparatus 122, the CPS 123 acquires a print job corresponding to the job code from the CPS 103 or the CPS 113, and transmits the print job to the image forming apparatus 122.

Each of the above-described components is communicably connected to each other via a predetermined network 100. The type of the network 100 is not particularly limited as long as data can be transmitted and received between the above-described components. As a specific example, any of or a combination of the internet, LAN, WAN, telephone line, dedicated digital line, ATM, and the like may be applied as the network 100.

In this embodiment, the CPSs 103, 113 are implemented as separate cloud print services so that each of the CPSs plays a role corresponding to an internal tenant and the CPS 123 plays a role corresponding to a public tenant. On the other hand, the configuration illustrated in FIG. 1 is merely an example, and does not necessarily limit the system configuration of the printing system according to the present embodiment. As a specific example, at least one of the CPSs 103, 113 may serve concurrently as the CPS 123. As another example, the CPS 123 may concurrently serve as at least one of the CPSs 103 and 113. In this manner, the functions of two or more cloud print services of the series of cloud print services illustrated in FIG. 1 may be realized by one cloud print service.

[Hardware Configuration]

Figure 2:
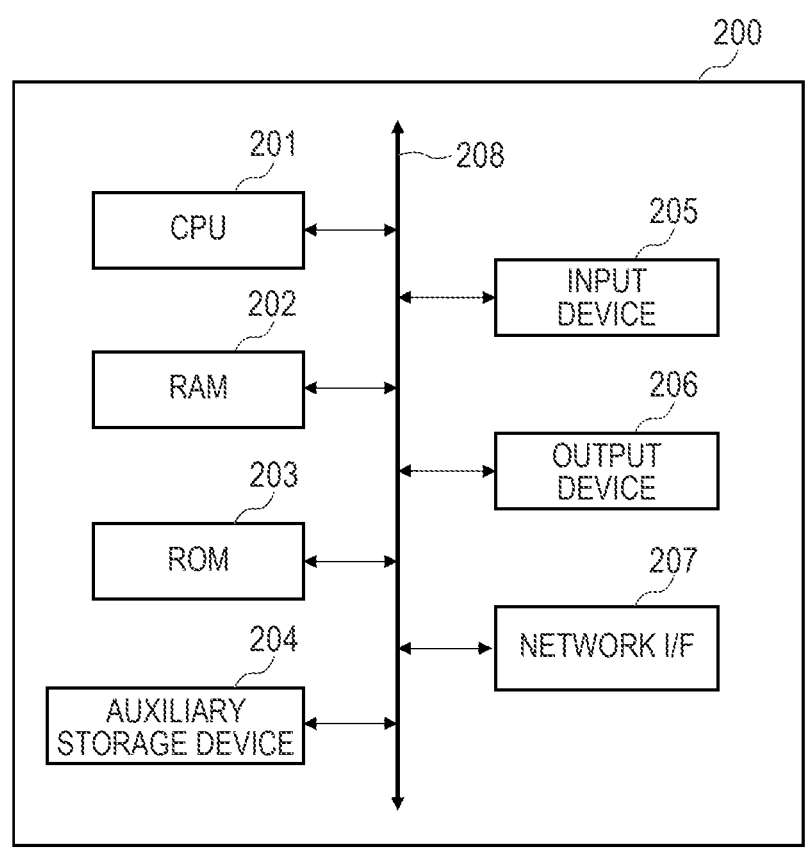
FIG. 2 illustrates an example of a hardware configuration of an information processing apparatus.

Referring to FIG. 2, an example of a hardware configuration of an information processing apparatus 200 constituting a system according to the embodiment of the present disclosure will be described. The information processing apparatus 200 according to the present embodiment includes a CPU (Central Processing Unit) 201, a RAM (Random Access Memory) 203, and a ROM (Read Only Memory) 202. The information processing apparatus 200 includes an auxiliary storage device 204 and a network I/F 207. The information processing apparatus 200 may include at least one of an input device 205 and an output device 206. The CPU 201, the RAM 202, the ROM 203, the auxiliary storage device 204, the input device 205, the output device 206, and the network I/F 207 are connected to each other via a bus 208.

The CPU 201 is a central processing unit that controls various operations of the information processing apparatus 200. For example, the CPU 201 may control the operation of the entire information processing apparatus 200. The RAM 202 is the main memory of the CPU 201 and is used as a work area or a temporary storage area for deploying various programs. The ROM 203 stores a program (for example, BIOS) for the CPU 201 to control the operation of the information processing apparatus 200.

The auxiliary storage device 204 stores programs such as an OS (Operating System) as basic software, various applications, and various data. The auxiliary storage device 204 may be realized by, for example, a hard disk drive (HDD) or a non-volatile memory such as a solid state drive (SDD).

The network I/F 207 is connected to a predetermined network (for example, LAN, internet, etc.) and is an interface for communicating with an external device via the network.

The input device 205 is a device for receiving an instruction from a user. The input device 205 may be implemented by, for example, a pointing device such as a mouse, an operating device such as a keyboard, a touch panel, and the like. The output device 206 is a device for presenting various kinds of information to the user. The output device 206 can be realized by a display device such as a display or the like, which displays various display information, a screen or the like to present information to a user.

The above-described configuration is merely an example, and does not necessarily limit the hardware configuration of the information processing apparatus 200. As a specific example, some of the components (for example, at least one of the input device 205 and the output device 206) in the information processing apparatus 200 described above may be external to the information processing apparatus 200. Further, the functional configuration described later with reference to FIG. 3 and the processing described later with reference to FIGS. 4, 6, 7, and 8 are realized when the desired information processing apparatus 200 deploys and executes a program stored in the ROM 203 and the auxiliary storage device 204 in the RAM 202.

[Functional Configuration]

Figure 3:
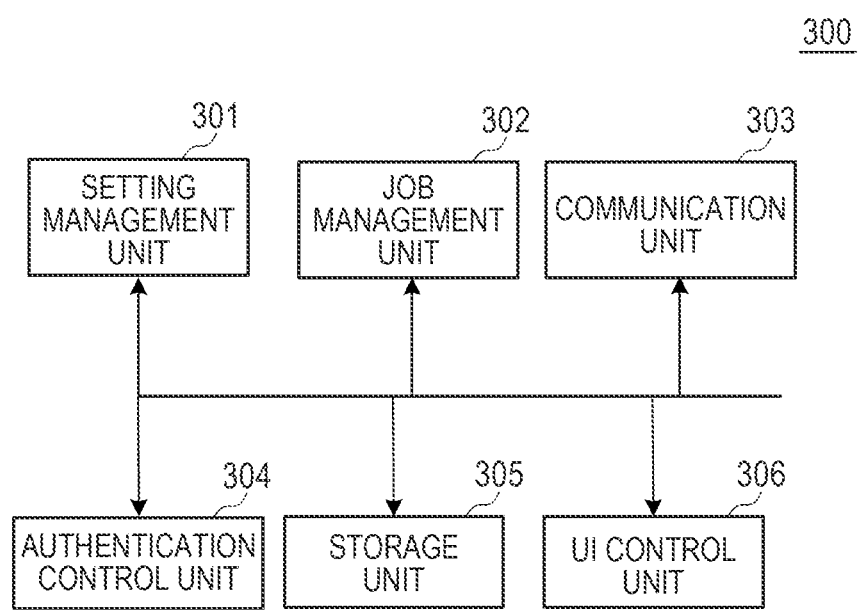
FIG. 3 illustrates an example of a functional configuration of an information processing apparatus.

Referring to FIG. 3, an example of the functional configuration of the information processing apparatus constituting the printing system according to the present embodiment will be described with particular attention paid to the configurations of the CPSs 103, 113, and 123. The CPSs 103, 113, and 123 may be provided by different information processing apparatuses, or a plurality of CPSs may be provided by one information processing apparatus. In the following description, for the sake of convenience, the description will be focused on the case where the information processing apparatus 300 executes various processes relating to the provision of the CPS 103, but substantially the same applies to the case where the CPS 113 and the CPS 123 are provided.

The information processing apparatus 300 includes a setting management unit 301, a job management unit 302, a communication unit 303, an authentication control unit 304, a storage unit 305, and a UI control unit 306.

The setting management unit 301 stores setting information relating to various functions of the CPS 103 in a predetermined storage area (for example, the RAM 202, the auxiliary storage device 204, etc.), and reads the setting information from the storage area at a desired timing. The setting information includes, for example, tenant information and job information (for example, the expiration date of a print job, etc.) about the input print job.

For example, the following Tables 1A and 1B show an example of the setting information of the cloud print service. Specifically, Table 1A shows an example of the setting information of the internal tenant (for example, the tenant of Company A). Table 1B shows an example of public tenant configuration information.

TABLE 1A

| Own tenant information | http://companyA.com |
| Public tenant information | http://public.com |
| Job expiration date information | 3 days |

TABLE 1B

| Own tenant information | http://public.com |
| Job expiration date information | 7 days |

First, an example of the internal tenant setting information shown in Table 1A will be described. The "own tenant information" is information for specifying an internal tenant (for example, the tenant of Company A), and for example, information such as a URL may be set. In the example shown in Table 1A, "http://companyA.com" is set as the own tenant information. The type of information set as the own tenant information is not particularly limited as long as the internal tenant can be specified, and an identifier such as a tenant ID may be set, for example.

The "public tenant information" is information for identifying a public tenant to be used as a job transmission destination or the like by the cloud print service associated with the internal tenant, and for example, information such as a URL may be set. In the example shown in Table 1A, "http://public.com" is set as the public tenant information. The type of information set as the public tenant information is not particularly limited as long as the public tenant can be specified, and for example, an identifier such as a tenant ID may be set.

The "job expiration date information" is an example of job information, and is information indicating the expiration date of a print job held by an internal tenant. In the example shown in Table 1A, "3 days" is set as the expiration date information of the job. With this setting value, a period for holding the print job can be set for each tenant.

Next, an example of public tenant setting information shown in Table 1B will be described. The "own tenant information" is information for specifying a public tenant, and for example, information such as a URL may be set. In the example shown in Table 1B, "http://public.com" is set as the own tenant information. Note that the type of information set as the own tenant information is not particularly limited as long as the public tenant can be identified, as in the example of the internal tenant shown in Table 1A.

The "job expiration date information" is an example of job information, and is information indicating the expiration date of a print job held by a public tenant. In the example shown in Table 1B, "7 days" is set as the expiration date information of the job. This setting value is an expiration date of information related to a print job held in a public tenant, and is a setting value commonly applied to each tenant such as the tenant of company A and the tenant of company B. In this embodiment, it is assumed that the expiration date of the print job in the internal tenant is set shorter than the expiration date of information related to the print job in the public tenant.

The job management unit 302 acquires information related to a job (for example, a print job or the like) from another device (for example, the client terminals 101 and 111, etc.) and stores the information in a prescribed storage area (for example, the storage unit 305 and the like). The job management unit 302 may acquire information related to the job (for example, a print job or the like) from the cloud print service (for example, the CPS 103 and 113, etc.) and store the information in a predetermined storage area. The job management unit 302 corresponding to the CPS 103 or the CPS 113 may determine whether a print job received from another device (for example, the client terminals 101 and 111, etc.) is permitted to be printed in a public space. The job management unit 302 may issue permission information related to the execution of the job. The job management unit 302 corresponding to the CPS 123 may issue a job code when receiving information related to a job (for example, a print job or the like) from the CPS 103 or the CPS 113. When the job management unit 302 receives a request for a job (for example, a print job or the like) for which a job code is designated from the image forming apparatus 122, the job management unit 302 may acquire the corresponding job from the CPS 103 or the CPS 113 and transmit the corresponding job to the image forming apparatus 122.

For example, the following Tables 2A and 2B show an example of a print job and information related to the print job that the cloud print service stores in a predetermined storage area. Specifically, Table 2A shows an example of a print job stored in a predetermined storage area by a cloud print service (for example, the CPS 103 or the CPS 113) corresponding to an internal tenant and information related to the print job. Table 2B shows an example of information related to a print job that a cloud print service (For example, the CPS 123) corresponding to a public tenant stores in a predetermined storage area.

TABLE 2A

| Job ID | 1a2b |
|---|---|
| Public printing | Permitted |
| Job code | 12345 |
| Job execution permission information | ... |
| Job data | ... |
| Job execution result | OK |
| ... | ... |

TABLE 2B

| Job ID | 9x8y |
|---|---|
| Job source | http://compamyA.com |
| Job code | 12345 |
| Job execution permission information | ... |
| Job execution result | OK |
| ... | ... |

First, an example of a print job and information related to the print job stored in a predetermined storage area by a cloud print service corresponding to an internal tenant shown in Table 2A will be described. A series of information shown in Table 2A is generated for each print job, for example, and stored in a predetermined storage area. In the following description, each piece of information is assumed to be managed by the CPS 103 as shown in Table 2A for convenience.

The "job ID" is identification information (ID value) uniquely assigned by the CPS 103 to manage the print job and information related to the print job.

The "public printing" is information indicating whether or not "printing in a public space" is permitted for a print job input in the company, and is set in response to a designation from the user. In the example shown in Table 2A, "permitted" is set as public printing.

The "job code" is a job code transmitted from the CPS 123 to the CPS 103 as a response when at least a part of information among a series of information related to the job exemplified in the table 2 A is transmitted from the CPS 103 to the CPS 123. This job code is used, for example, to designate a print job to be printed by the image forming apparatus 122.

The "job execution permission information" is information issued by the CPS 103 when the job code is received from the CPS 123, and is notified from the CPS 103 to the CPS 123 after the job code is received. The job execution permission information is, for example, an access token, and when the CPS 123 transmits a print job acquisition request to the CPS 103, it is notified along with the request to the CPS 103. Thus, the CPS 103 can confirm whether the CPS 123 is appropriate as a request source of the print job.

The "job data" is data of the print job itself, for example, binary data. As a specific example, the data of the print job is data conforming to PDL (Page Description Language) or PDF (Portable Document Format). Information (for example, an address or the like) for accessing the document stored in the external storage may be set as the "job data" instead of the data of the print job itself.

The "job execution result" is information corresponding to the result of execution of the print job by the image forming apparatus 102 or 122. In the example shown in Table 2A, "OK" indicating that printing has been executed normally is set as a job execution result. The job execution result is, for example, information that the CPS 103 receives from the CPS 123 together with the job code. When an error occurs during printing, an error code or the like may be set as a job execution result. Further, any of color printing and monochrome printing, the number of pages and the number of copies, accounting information, and the like may be included in the job execution result. Furthermore, the job execution result may include information about the date, time, place, and the like at which the printing is executed.

Next, an example of information relating to a print job that a cloud print service corresponding to a public tenant stores in a predetermined storage area, shown as Table 2B, will be described. The series of information shown in Table 2B is stored in a predetermined storage area generated, for example, in units of information (in other words, a print job unit) related to the print job received by the CPS 123.

The "job ID" is identification information (ID value) uniquely assigned by the CPS 123 to manage information related to the job for printing.

The "job source" is information for specifying the cloud print service (for example, the CPS 103) that has transmitted information about the print job to the CPS 123, and for example, information such as a URL may be set. In the example shown in Table 2B, "http://companyA.com" is set as the job source.

The "job code" is a job code issued by the CPS 123 when the CPS 123 receives information related to the print job from the CPS 103. The CPS 123 transmits the issued job code to the CPS 103. This job code corresponds to the job code shown in Table 2A. That is, the job code is used, for example, to designate a print job to be printed by the image forming apparatus 122.

The "job execution permission information" is information for permission of job execution notified from the CPS 103 to the CPS 123 after the CPS 123 transmits the job code to the CPS 103. The job execution permission information is, for example, an access token. The job execution permission information corresponds to the job execution permission information shown in Table 2A. That is, when the CPS 123 requests the CPS 103 to acquire a print job, the job execution permission information is notified along with the request to the CPS 103.

The "job execution result" is information corresponding to the result of execution of the print job by the image forming apparatus 102 or 122. In the example shown in Table 2B, "OK" indicating that printing has been executed normally is set as a job execution result. This job execution result corresponds to the job execution result shown in Table 2A. For example, the CPS 123 receives the job execution result from the image forming apparatus 122 and transmits the job execution result together with the job code to the CPS 103.

The communication unit 303 transmits and receives various data to and from other apparatuses (for example, the client terminals 101 and 111, the image forming apparatuses 102, 112, and 122, and the like). For example, the communication unit 303 may receive a print job, a job execution request, or the like from other apparatuses. The communication unit 303 may receive various processing requests from other cloud print services and transmit information corresponding to the processing results to the cloud print services.

The authentication control unit 304 executes various processes related to user management. The authentication control unit 304 may store information about the user added in response to an instruction from the tenant manager in a predetermined storage area (for example, the storage unit 305 to be described later). As another example, the authentication control unit 304 may manage information about the user by cooperating with an external authentication service.

The storage unit 305 stores various data. For example, the storage unit 305 may store various data in response to a request from the job management unit 302 or the authentication control unit 304.

In response to a request from another device (for example, the client terminals 101 and 111, the image forming apparatuses 102, 112, and 122, and the like), the UI control unit 306 executes processing relating to an output of the UI for accepting an input from the user and presenting various kinds of information to the user. As a specific example, the UI control unit 306 may generate a screen described later with reference to FIGS. 5A to 5D in response to a request from a browser operating on the client terminal 101, and transmit the screen (alternatively, data pertaining to the output of the screen) to the client terminal 101 via the communication unit 303. Thus, the screen generated by the UI control unit 306 is presented to the user through a browser operating on the client terminal 101.

[Processing]

An example of the processing of the printing system according to the present embodiment will be described with reference to FIGS. 4 to 8. First, with reference to FIGS. 4 and 5A to 5D, an example of a process relating to input of a print job by the client terminal (for example, the client terminals 101, 111, etc.) will be described. Note that, for the sake of convenience, an example of the processing of the client terminal 101 when the client terminal 101 transmits a print job to the CPS 103 will be described below with reference to the tenant of the company A.

Figure 4:
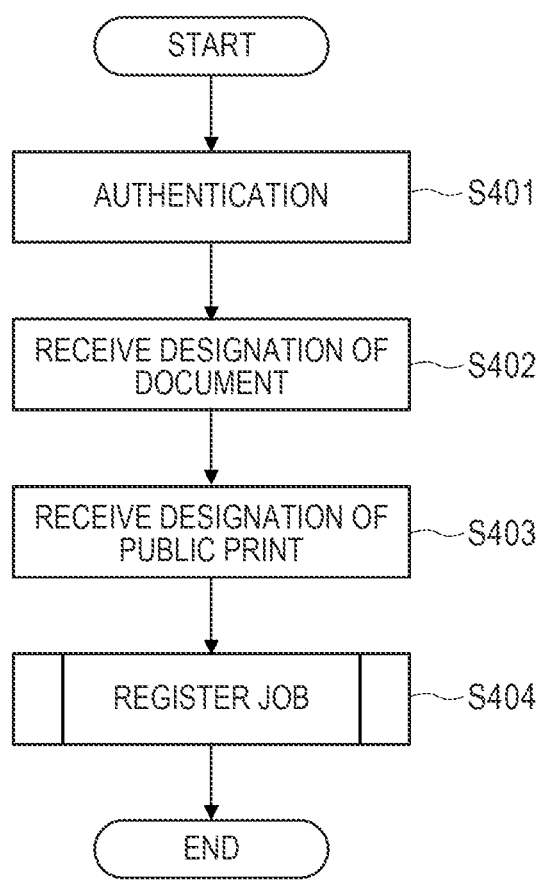
FIG. 4 illustrates an example of a flowchart of processing of a client terminal.

The series of processing illustrated in FIG. 4 is executed, for example, in response to an instruction from a user via a display device or an input device of the client terminal 101, or an instruction from the user received by an application installed in the client terminal 101. In the following description, it is assumed that the browser is used to receive the instruction from the user. Specifically, the top screen of the UI pertaining to the use of the CPS 103 is displayed based on the URL "http://companyA.com" corresponding to the CPS 103 entered in the URL input field of the browser.

For example, a screen 500 illustrated in FIG. 5A shows an example of the top screen. The screen 500 is a screen for receiving input of information related to user authentication. An input area 501 is an area for receiving input of a user name (identification information) for identifying the user from the user. An input area 502 is an area for receiving input of a password used for authentication of the user from the user. A button 503 is a button for receiving an instruction for executing the authentication of the user based on the user name inputted to the input area 501 and the password inputted to the input area 502 from the user. On the other hand, a button 504 is a button for receiving an instruction for cancelling the use of the CPS 103 from the user.

In step S401, when the user name and password are input to the input areas 501 and 502 of the screen 500 and the button 503 is pressed, the client terminal 101 transmits the user name and password to the CPS 103. The authentication control unit 304 of the CPS 103 executes processing related to authentication of the user corresponding to the user name based on the user name and password transmitted from the client terminal 101. In this case, the authentication control unit 304 may request a predetermined authentication service to authenticate the user. When the user is successfully authenticated in the process of step S401, a screen 510 shown in FIG. 5B is presented through the browser. Specifically, the client terminal 101 accesses the CPS 103 to acquire data of the screen 510, and presents the screen 510 to the user based on the data.

The screen 510 illustrated in FIG. 5B shows an example of a menu screen for receiving an instruction for displaying a screen serving as a user interface for utilizing various functions from a user. An item 511 is an item for receiving an instruction from a user on the display of a screen associated with a function related to registration of a print job. An item 512 is an item for receiving an instruction from a user on the display of a screen associated with a function related to the confirmation of the registered print job. An item 513 is an item for receiving an instruction from a user on the display of a screen associated with a function related to confirmation and change of various settings.

In step S402, the client terminal 101 receives a designation of a document to be printed from the user. Specifically, when the item 511 is designated in the screen 510 displayed in step S401, the client terminal 101 accesses the CPS 103 to acquire data of a screen 520 related to the registration of the job, and presents the screen 520 to the user based on the data. The client terminal 101 receives designation of a document to be printed from the user via the screen 520.

The screen 520 illustrated in FIG. 5C shows an example of a screen for receiving an instruction for specifying a document to be printed from a user. An input area 521 is an input area for receiving a designation of a document to be printed from a user. The instruction for specifying the document is received by dragging and dropping the data (file, etc.) of the target document to the input area 521 using an input device such as a mouse pointer, for example. Of course, if the data of the target document can be specified, the method of specifying the data is not limited. A check box 522 is a user interface for receiving an instruction related to permission of printing in a public space from a user. The button 523 is a button for receiving an instruction relating to registration of a print job based on the information inputted to the input area 521 and the input state of the check box 522 from the user. A button 524 is a button for receiving an instruction for cancelling registration of a print job from a user.

In step S403, the client terminal 101 receives an instruction from the user via the screen 520 as to whether or not "printing in the public space" is permitted. As a specific example, the client terminal 101 may recognize that printing in the public space is permitted when a check is input to the check box 522. On the other hand, when the check box 522 is unchecked, the client terminal 101 may recognize that printing in the public space is restricted.

In step S404, the client terminal 101 receives an instruction for registering a job based on the information input to the screen 520. Specifically, when the button 523 is pressed, the client terminal 101 transmits the information inputted to the input area 521 and the information corresponding to the input state of the check box 522 to the CPS 103. Thus, registration of the job is requested to the CPS 103. When printing in the public space is permitted by inputting a check in the check box 522, a series of processes illustrated in FIG. 6 is executed. On the other hand, when printing in the public space is restricted by unchecking the check box 522, a series of processes illustrated in FIG. 7 is executed.

A screen 530 illustrated in FIG. 5D shows an example of a screen pertaining to the notification of a job code to be described later, and is presented to the user by the client terminal 101 in the processing of S608 or S708 to be described later. The screen 530 may be presented to the user via a medium such as mail, for example. The issued job code is presented on the screen 530. In addition to the job code, an expiration date of a print job, a file name of a document designated via the screen 520, and the like may be presented on the screen 530. For the expiration date, for example, the date on which the smaller number of days of the "job expiration date information" in Table 1A or Table 1B has elapsed from the date of execution of the processing relating to the registration of the job shown in FIG. 4 is presented. As a specific example, in the example illustrated in FIG. 5D, a print job is submitted on Dec. 1, 2020, and the expiration date of the print job is set to Dec. 4, 2020, which is three days after the submission (expiration date shown in Table 1A).

Next, an example of a processing sequence between the client terminal 101, the CPS 103, the CPS 123, and the image forming apparatus 122 when printing in the public space is permitted will be described with reference to FIG. 6. The series of processes illustrated in FIG. 6 shows, for example, an example of a processing sequence related to "printing using an image forming apparatus installed in a public space" executed when the button 523 of the screen 520 is pressed in step S405.

In step S601, the client terminal 101 transmits the information input to the screen 520 to the CPS 103, thereby registering a job based on the information in the CPS 103.

In step S602, the job management unit 302 of the CPS 103 receives information about the print job from the client terminal 101, and confirms whether or not printing in the public space is permitted based on the information. As described above, in the example illustrated in FIG. 6, it is assumed that printing in a public space is permitted. The job management unit 302 of the CPS 103 transmits an issue request of a job code together with information of a request source to the CPS 123. As the information for specifying the CPS 123 as the transmission destination, for example, information (for example, an address or the like) which is set in advance as "public tenant information" in Table 1A can be used. The requester information corresponds to, for example, information for specifying the CPS 103 as a transmission destination, and includes the URL of the CPS 103, "http://companyA.com". At this time, the job management unit 302 of the CPS 103 may transmit information related to the print job received from the client terminal 101 along with the request to the CPS 123.

In step S603, the job management unit 302 of the CPS 123 receives a request to issue a job code from the CPS 103 and issues the job code. At this time, the job management unit 302 of the CPS 123 receives the information of the request source and the information related to the print job from the CPS 103, and stores the issued job code in the storage unit 305 in association with the received information. For example, the information shown in Table 2B corresponds to one example of the information related to the print job.

In step S604, the job management unit 302 of the CPS 123 transmits the job code issued in step S603 to the CPS 103.

In step S605, the job management unit 302 of the CPS 103 receives the job code from the CPS 123 and issues job execution permission information corresponding to the job code. For example, the information shown in Table 2A corresponds to one example of the received job code and the issued job execution permission information. Further, the job management unit 302 of the CPS 103 may embed information on the expiration date of the target print job in the job execution permission information. Information on the expiration date of the print job can be set, for example, based on the job expiration date information included in the internal tenant setting information shown in Table 1A. The job management unit 302 of the CPS 103 stores the information in the storage unit 305.

In step S606, the job management unit 302 of the CPS 103 transmits the job execution permission information issued in step S605 to the CPS 123. In step S607, the job management unit 302 of the CPS 123 receives the job execution permission information from the CPS 103 and stores the job execution permission information in the storage unit 305.

In step S608, the job management unit 302 of the CPS 103 notifies the user of the job code issued by the CPS 123. The processing in step S608 may be realized, for example, by mail notification to the mail address associated with the user authenticated in step S402. As another example, the user may be notified of the job code by presenting a screen on which the job code is displayed via the client terminal 101.

In step S609, the image forming apparatus 122 receives an input of a job code corresponding to a desired print job from a user. The job code input here includes, for example, the job code notified from the CPS 103 in step S608. This job code is used by the CPS 123 to specify a print job. Therefore, it is not necessary to execute the processing related to the reception of the input of the job code. As a specific example, the image forming apparatus 122 may authenticate the user by accepting an input related to authentication from the user, and may accept a designation of a desired print job from the list of jobs associated with the user.

In step S610, the image forming apparatus 122 transmits the job code (in other words, information to identify the job) received in step S609 to the CPS 123, and requests the CPS 123 to transmit a print job. In step S611, the job management unit 302 of the CPS 123 transmits the job code transmitted from the image forming apparatus 122 in step S610 and the job execution permission information corresponding to the job code to the CPS 103.

In step S612, the job management unit 302 of the CPS 103 verifies the job execution permission information transmitted from the CPS 123 in step S611. Specifically, the job management unit 302 of the CPS 103 retrieves information related to the print job whose job code matches the job code from the job-related information (see Table 2A) stored in the storage unit 305. Then, for example, the job management unit 302 of the CPS 103 may verify whether the job execution permission information included in the information related to the retrieved print job matches the job execution permission information received from the CPS 123. As another example, the job management unit 302 of the CPS 103 may perform authorization using an external authorization service or the like, and perform verification using the results thereof. If the job execution permission information includes information about the expiration date of the print job, the job management unit 302 of the CPS 103 may verify whether the job execution permission information is within the expiration date. In the example illustrated in FIG. 6, it is assumed that there is no problem in the verification in step S612, and the following processing will be described.

In step S613, the job management unit 302 of the CPS 103 transmits a print job corresponding to the job code received from the CPS 123 to the CPS 123. The target print job is, for example, data shown as job data in Table 2A. If it is possible for the job management unit 302 of the CPS 103 to specify a print job to be transmitted to the CPS 123, the information notified from the job management unit 302 of the CPS 123 to the CPS 103 in step S611 is not necessarily limited to a job code. That is, the job management unit 302 of the CPS 103 may transmit information about the target print job (for example, identification information that can uniquely identify a print job, etc.) to the CPS 103 instead of the job code. In step S614, the job management unit 302 of the CPS 123 receives the print job from the CPS 103 and transmits the print job to the image forming apparatus 122. In step S615, the image forming apparatus 122 receives a print job from the CPS 123 and executes the print job. In this case, the image forming apparatus 122 may present a screen pertaining to the change of the print setting to the user and receive an instruction pertaining to the change of the print setting from the user via the screen.

In step S616, the image forming apparatus 122 transmits the execution result of the print job in step S615 and the job code corresponding to the print job to the CPS 123. In step S617, the job management unit 302 of the CPS 123 receives the execution result of the print job and the job code from the image forming apparatus 122, and transmits the execution result of the print job and the job code to the CPS 103. In this case, the job management unit 302 of the CPS 123 may store the execution result of the received print job in the storage unit 305. Specifically, the job management unit 302 of the CPS 123 retrieves job-related information corresponding to the received job code from the job-related information (see Table 2B) stored in the storage unit 305. The job management unit 302 of the CPS 123 may store the execution result in the storage unit 305 by associating the execution result of the received print job with the retrieved job-related information.

In step S618, the job management unit 302 of the CPS 103 receives the execution result of the print job and the job code from the CPS 123, and stores the execution result of the print job and the job code in the storage unit 305. Specifically, the job management unit 302 of the CPS 103 retrieves job-related information corresponding to the received job code from the job-related information (see Table 2A) stored in the storage unit 305. The job management unit 302 of the CPS 103 may store the execution result in the storage unit 305 by associating the execution result of the received print job with the retrieved job-related information.

As shown in FIG. 6, a print job entered in a state in which printing in a public space is permitted can be used for printing by an image forming apparatus registered in an internal tenant. As a specific example, when the image forming apparatus 102 executes printing based on an instruction from a user by specifying a print job registered based on the processing of steps S601 to S608, the processing of steps S704 to S710, which will be described later with reference to FIG. 7, may be executed. Thus, two use cases of "printing using an image forming apparatus installed in a company" and "printing using an image forming apparatus installed in a public space" can be realized.

Next, referring to FIG. 7, an example of a processing sequence between the client terminal 101, the CPS 103, and the image forming apparatus 102 when printing in the public space is restricted will be described. The series of processes illustrated in FIG. 6 shows, for example, an example of a processing sequence related to "printing using an image forming apparatus installed in the company" executed when the button 523 of the screen 520 is pressed in step S405.

The processing in step S701 is the same as that in step S601. In step S702, the job management unit 302 of the CPS 103 receives information about the print job from the client terminal 101, and the job management unit 302 of the CPS 103 confirms whether or not printing in the public space is permitted based on the information. As described above, in the example shown in FIG. 7, it is assumed that printing in the public space is restricted. In this case, the job management unit 302 of the CPS 103 issues a job code. At this time, the job management unit 302 of the CPS 103 associates the received print job with the issued job code and stores the print job and the job code in the storage unit 305. For example, the print job-related information shown in Table 2A corresponds to an example of information stored in the storage unit 305. The processing in step S703 is same as that in step S608.

In step S704, the image forming apparatus 102 receives an input of a job code corresponding to a desired print job from a user. The processing is substantially same as that in step S609, except that the processing is executed by the image forming apparatus 102. The job code input here includes, for example, the job code notified from the CPS 103 in step S703.

In step S705, the image forming apparatus 102 transmits the job code received in step S704 to the CPS 103, and requests a print job from the CPS 103. In step S706, the job management unit 302 of the CPS 103 receives the job code and the print job from the image forming apparatus 102 and confirms the job code. Specifically, the job management unit 302 of the CPS 103 retrieves information related to the print job including a job code matching the job code received from the image forming apparatus 102 from job-related information (see Table 2A) stored in the storage unit 305.

In step S707, the job management unit 302 of the CPS 103 transmits the print job associated with the job code to the image forming apparatus 102. In step S708, the image forming apparatus 102 receives the print job from the CPS 103 and executes the print job.

In step S709, the image forming apparatus 102 transmits the execution result of the print job in step S708 and the job code corresponding to the print job to the CPS 103. In step S710, the job management unit 302 of the CPS 103 receives the execution result of the print job and the job code from the image forming apparatus 102, and stores the execution result of the print job and the job code in the storage unit 305.

Next, with reference to FIG. 8, an example of a processing sequence between the client terminal 101, the CPS 103, and the CPS 123 pertaining to deletion of a print job stored in the CPS 103 or the CPS 123 will be described. The series of processing sequences illustrated in FIG. 8 are executed, for example, when an instruction for deletion of a print job is received from a user, or when deletion of the print job is automatically performed when the expiration date shown in Table 1A has passed. In addition, even in the case where the deletion of the print job is simultaneously executed by executing printing, a series of processing sequences illustrated in FIG. 8 may be executed. In the example shown in FIG. 8, a request for deletion of a print job is made from the CPS 103 to the CPS 123, but a request for deletion of a print job may be made from the CPS 123 to the CPS 103.

In step S801, the client terminal 101 requests the CPS 103 to delete the print job in response to an instruction from the user. As a specific example, the client terminal 101 may present a screen relating to the deletion request of the print job to the user via a browser or the like, and may accept the designation of information (for example, a job code) relating to the print job to be deleted via the screen. As another example, the client terminal 101 may present a list of the submitted print jobs to the user, and may accept a designation of a print job to be deleted in the list from the user. In this case, for example, the client terminal 101 may acquire information on the print job that has been input from the CPS 103, and create the list based on the information. The screen may be presented to the user, for example, when the item 512 shown in the screen 510 is designated.

In step S802, the job management unit 302 of the CPS 103 retrieves, from the storage unit 305, job-related information (see Table 2A) corresponding to the print job that has received the deletion request, and confirms whether printing in the public space is permitted based on the information. The job management unit 302 of the CPS 103 advances the process to step S803 when printing in the public space is permitted. On the other hand, the job management unit 302 of the CPS 103 advances the process to step S807 when printing in the public space is restricted.

In step S803, the job management unit 302 of the CPS 103 transmits the job code and job execution permission information corresponding to the print job to be deleted to the CPS 123, and requests the deletion of the print job. The job execution permission information transmitted to the CPS 123 in the process of step S803 is information included in the job-related information retrieved in step S802.

In step S804, the job management unit 302 of the CPS 123 receives the job code and job execution permission information from the CPS 103 together with the deletion request of the print job. The job management unit 302 of the CPS 123 retrieves job-related information (see Table 2B) corresponding to the received job code from the storage unit 305. Then, the job management unit 302 of the CPS 123 may verify whether the received job execution permission information matches the information included in the retrieved print job-related information. As another example, the job management unit 302 of the CPS 123 may perform authorization using an external authorization service, and verify the print job-related information based on the result of the authorization. In the example illustrated in FIG. 8, it is assumed that there was no problem in the verification in step S804, and the following processing will be described.

In step S805, the job management unit 302 of the CPS 123 deletes the job-related information (see table 2B) retrieved in step S804. In this case, the job management unit 302 of the CPS 123 may store information about the target print job in a predetermined storage area as history. As a specific example, the job management unit 302 of the CPS 123 may hold a set value such as a flag for not responding to a print request from the image forming apparatus 122 (for responding to the request as an error). Further, among the job-related information, the reproduction of the information may be stored in a predetermined storage area (for example, the storage unit 305) for the information used as the history.

In step S806, the job management unit 302 of the CPS 123 notifies the CPS 103 that the deletion of the print job has been completed.

In step S807, the job management unit 302 of the CPS 103 deletes the data corresponding to the print job designated as the deletion target. In this case, the job management unit 302 of the CPS 103 may store information about the target print job in a predetermined storage area as history. As a specific example, the job management unit 302 of the CPS 103 may store a copy of the job-related information (see Table 2A) corresponding to a print job to be deleted in a predetermined storage area (for example, the storage unit 305) for information to be used as a history.

According to the present invention, cloud print services related to tenants and public tenants can be linked in a more suitable manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-057435, filed Mar. 30, 2021, which is hereby incorporated by reference herein in its entirety.

What is claimed is:
1. A system comprising:
a first cloud print service connectable with a client terminal via a network; and
a second cloud print service connectable with an image forming apparatus via the network,
wherein the first cloud print service comprises: one or more first memories storing first instructions, and one or more first processors that execute the first instructions to:
store print job data received from the client terminal in the one or more first memories;
request the second cloud print service to issue a job code of the print job data without transmitting the stored print job data to the second cloud print service;
receive the job code issued by the second cloud print service;

store the received job code in association with the stored print job data; and transmit the stored print job data to the second cloud print service in response to receiving, from the second cloud print service, the job code, which is input from the image forming apparatus, wherein the second cloud print service comprises: one or more second memories storing second instructions, and one or more second processors that execute the second instructions to:

issue the job code in response to the request for the issuance of the job code by the first cloud print service;

store the issued job code in association with information indicating the first cloud print service;

transmit the issued job code to the first cloud print service;

receive, from the image forming apparatus, the job code input from the image forming apparatus;

transmit the input job code to the first cloud print service associated with the input job code in response to receiving the input job code from the image forming apparatus;

receive, from the first cloud print service, the print job data corresponding to the input job code; and transmit the received print job data to the image forming apparatus.

2. The system according to claim 1, wherein:

the print job data received from the client terminal includes an instruction on permission or restriction of printing using the second cloud print service, and the first cloud print service requests the second cloud print service to issue the job code of the print job data in a state where the received print job data includes an instruction for permitting printing using the second cloud print service.

3. The system according to claim 1, wherein:

the one or more first processors further execute the first instructions to:

issue permission information related to the execution of processing based on the stored print job data; and transmit the permission information to the second cloud print service, the one or more second processors further execute the second instructions to:

store the permission information received from the first cloud print service; and transmit the input job code and the stored permission information to the first cloud print service in response to receiving the input job code from the image forming apparatus, and in response to the first cloud print service receiving the input job code and the permission information from the second cloud print service, the one or more first processors further execute the first instructions to:

verify the received permission information; and transmit the stored print job data to the second cloud print service, in a state where the received permission information has been successfully verified.

4. The system according to claim 3, wherein the one or more first processors further execute the first instructions to:

transmit, to the second cloud print service, the issued permission information including embedded information related to an expiration date for the stored print job data; and transmit the stored print job data to the second cloud print service, in a state where the expiration date for the stored print job data stored in the one or more first memories is determined to be within the expiration date embedded in the received permission information and the received permission information has been verified.

5. A method of controlling a system including a first cloud print service and a second cloud print service, the first cloud print service being connectable with a client terminal via a network and the second cloud print service being connectable with an image forming apparatus via the network, the method comprising:

storing, by the first cloud print service, print job data received from the client terminal;

requesting, by the first cloud print service, the second cloud print service to issue a job code of the print job data without transmitting the stored print job data to the second cloud print service;

receiving, by the first cloud print service, the job code issued by the second cloud print service;

storing, by the first cloud print service, the received job code in association with the stored print job data;

transmitting, by the first cloud print service, the stored print job data to the second cloud print service in response to receiving, from the second cloud print service, the job code, which is input from the image forming apparatus;

issuing, by the second cloud print service, the job code in response to the request for the issuance of the job code by the first cloud print service;

storing, by the second cloud print service, the issued job code in association with information indicating the first cloud print service;

transmitting, by the second cloud print service, the issued job code to the first cloud print service;

receiving, by the second cloud print service, the job code input from the image forming apparatus from the image forming apparatus;

transmitting, by the second cloud print service, the input job code to the first cloud print service associated with the input job code in response to receiving the input job code from the image forming apparatus;

receiving, by the second cloud print service, the print job data corresponding to the input job code from the first cloud print service; and transmitting, by the second cloud print service, the received print job data to the image forming apparatus.

* * * * *